(12) United States Patent
Liang

(10) Patent No.: US 7,312,432 B2
(45) Date of Patent: Dec. 25, 2007

(54) SINGLE AXIS ILLUMINATION FOR MULTI-AXIS IMAGING SYSTEM

(75) Inventor: Chen Liang, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 0 days.

(21) Appl. No.: 10/191,874

(22) Filed: Jul. 8, 2002

(65) Prior Publication Data

US 2004/0004176 A1    Jan. 8, 2004

(51) Int. Cl.
 *H01J 3/16* (2006.01)
 *G02B 21/06* (2006.01)
(52) U.S. Cl. ..................... 250/216; 359/385
(58) Field of Classification Search ............... 250/216, 250/208.1, 201.1–201.8; 359/368, 385, 389
 See application file for complete search history.

(56) References Cited

U.S. PATENT DOCUMENTS

| | | | | |
|---|---|---|---|---|
| 4,845,352 A | * | 7/1989 | Benschop | 250/201.7 |
| 5,241,364 A | * | 8/1993 | Kimura | 356/491 |
| 5,260,826 A | * | 11/1993 | Wu | 359/368 |
| 5,430,807 A | * | 7/1995 | Gravely | 382/128 |
| 5,439,578 A | * | 8/1995 | Dovichi et al. | 204/603 |
| 5,880,835 A | * | 3/1999 | Yamazaki et al. | 356/336 |
| 5,969,810 A | * | 10/1999 | Nicks et al. | 356/239.4 |
| 6,133,986 A | | 10/2000 | Johnson | 355/67 |
| 6,239,421 B1 | * | 5/2001 | Nagata et al. | 250/208.1 |
| 6,320,174 B1 | | 11/2001 | Tafas et al. | 250/208.1 |
| 6,373,978 B1 | | 4/2002 | Ishihara | 382/154 |
| 6,384,967 B1 | * | 5/2002 | Watanabe et al. | 359/385 |
| 6,420,709 B1 | * | 7/2002 | Block et al. | 250/343 |
| RE38,307 E | * | 11/2003 | Gustafsson et al. | 359/385 |
| 6,657,787 B1 | * | 12/2003 | Otaki | 359/618 |
| 6,686,582 B1 | | 2/2004 | Volcker et al. | 250/216 |
| 6,711,283 B1 | * | 3/2004 | Soenksen | 382/133 |
| 6,859,516 B2 | * | 2/2005 | Schneider et al. | 378/43 |
| 6,867,860 B2 | * | 3/2005 | Tanaami et al. | 356/318 |
| 2001/0005280 A1 | | 6/2001 | Ouchi | 359/385 |

* cited by examiner

*Primary Examiner*—Thanh X. Luu
(74) *Attorney, Agent, or Firm*—Birdwell & Janke, LLP

(57) ABSTRACT

A single-axis illumination system for a multiple-axis imaging system, particularly an array microscope. A single-axis illumination system is used to trans-illuminate an object viewed with an array of imaging elements having multiple respective axes. The numerical apertures of the imaging elements are preferably matched to the numerical aperture of the illumination system. For Kohler illumination, the light source is placed effectively at the front focal plane of the illumination system. For critical illumination, the light source is effectively imaged onto the object plane of the imaging system. For dark field illumination, an annular light source is effectively provided. For phase contrast microscopy, an annular phase mask is placed effectively at the back focal plane of the objective lens of the imaging system and a corresponding annular amplitude mask is provided effectively at the light source. For Hoffman modulation contrast microscopy, an amplitude mask is placed effectively at the back focal plane of the objective lens of the imaging system and a slit is provided at a source of light of the illumination system. Structured illumination and interferometry, and a secondary source, may also be used with trans-illumination methods and apparatus according to the present invention.

13 Claims, 16 Drawing Sheets

SINGLE AXIS ILLUMINATION FOR MULTI-AXIS IMAGING SYSTEM

This invention relates to trans-illumination for imaging systems, particularly to a single axis trans-illumination system for a multi-axis imaging system, and more particularly for a microscope array comprising a plurality of optical imaging elements having respective optical axis.

BACKGROUND OF THE INVENTION

In imaging systems, particularly microscopy, adequate and appropriate illumination of the object to be imaged is essential. There must be enough light provided to the object or specimen to be viewed to permit the viewer to discern features of the object. In addition, the manner in which the light is provided to the object makes a difference in what features can be detected and the contrast with which they are imaged.

An ordinary microscope typically employs a compound imaging lens system for imaging the object. Any number of lenses or other optical elements such as polarizers, collimators, spreading optics, mirrors, and splitters may be included in the lens system. The lens system may be characterized in part by its numerical aperture, which essentially defines the limiting angle at which light from the object can pass into the lens system.

The object to be imaged by a microscope is typically located at the object plane by being placed on a substrate that is, in turn, positioned on a stage of the microscope that can be moved laterally with respect to the optical axis of the lens system. The stage may be motorized so that this movement may be automated or controlled by a computer. Moreover, the image plane may be provided with a camera or other imaging device for recording the image, or for monitoring the image under the same computer control.

In addition to being characterized by its numerical aperture, an imaging lens system is also characterized by its field of view. The field of view in visible light microscopes typically ranges from tens of microns to a few millimeters. This means that a macroscopically sized object of, for example, 20 mm×50 mm requires many movements of the stage for imaging the entire object. The stage manipulation and the consequent time required to image an object under high magnification is particularly troublesome in pathology analysis since the diagnostic information in the tissue may be located in only a small portion of the object that is being imaged.

A recent innovation in the field of light microscopy that addresses this problem is a miniaturized microscope array ("MMA") which, when applied to a common object, is also referred to as an "array microscope." In miniaturized microscope arrays, a plurality of imaging lens systems are provided having respective optical axes that are spaced apart from one another. Each imaging lens system images a respective portion of the object.

In an array microscope, a linear array is preferably provided for imaging across a first dimension of the object, and the object is translated past the fields of view of the individual imaging elements in the array, so that the array is caused to scan the object across a second dimension to image the entire object. The relatively large individual imaging elements of the imaging array are staggered in the direction of scanning so that their relatively small fields of view are contiguous over the first dimension. The provision of the linear detector arrays eliminates the requirement for mechanical scanning along the first dimension, providing a highly advantageous increase in imaging speed.

As mentioned, microscopy depends on having an adequate source of light to illuminate the object. Several different types of illumination systems can be employed. One type illumination system is known as "epi-illumination." In epi-illumination, light illuminates the surface of the object and is either reflected from or back-scattered by the object into the imaging lens system. This light may also be effectively transformed in wavelength by the object, as a result of the object's fluorescence, which is known as "epi-fluorescence." Epi-illumination is necessary where the object to be imaged is opaque.

On the other hand, if the object to be imaged is not opaque, it can be illuminated by light transmitted through the object. This type of illumination is known as "dial illumination," "through illumination," or, as referred to herein, "trans-illumination." An otherwise opaque object can be made to be light transmissive by cutting it into thin sections, or the object may be formed of transparent or partially transparent materials, such as biological materials. For example, pathologists routinely view tissue specimens and liquid specimens such as urine and blood using trans-illumination in a light microscope.

Trans-illumination typically makes use of an illumination lens system that projects light from a light source through the aforementioned substrate, through the object, and into the imaging lens system. The substrate is typically a glass or other transparent material slide, about 1 to 1.5 mm thick. The object to be viewed is mounted to or disposed on a front side of the substrate and light is applied to the object through the back side of the substrate. Since it is also formed of optical elements, the illumination lens system is governed by the same optical principles as the imaging lens system. Thence, the illumination lens system is likewise characterized by its numerical aperture and its field of view.

There are two primary trans-illumination systems. In one of these, known as Kohler illumination, the image plane of the illumination system is placed at the pupil plane of the imaging system, or a conjugate thereof, so that the light source is imaged into the pupil of the imaging system. The other primary illumination strategy is known as critical illumination. In this case, the image plane of the illumination system is placed at the object plane of the imaging system, or a conjugate thereof, so that the light source is imaged into the object plane of the imaging system. An advantage of Kohler illumination is that each point on the image plane experiences the average light intensity that is provided by the source, so that illumination is insensitive to spatial variations in source radiance. Critical illumination permits the optical system to be made shorter than that of a Kohler illumination system and increases illumination efficiency; however, it requires that the light source provide spatially uniform radiance.

The MMA concept invites the corresponding concept of providing each imaging element with a corresponding illumination element. For optimal effect, the numerical aperture of illumination lens systems need to be matched to the numerical aperture of their corresponding imaging elements. That is, if the illumination system transmits light to the object at angles greater than the acceptance angle of the imaging system, some of the light may be wasted, which reduces system efficiency. On the other hand, if the illumination system transmits light over a narrower angular range, that is, one that does not extend to the acceptance angle, the imaging system cannot take full advantage of its resolving power.

In a high numerical aperture array microscope it is desirable to pack the imaging elements of the array close together so as to acquire image data for contiguous parts of the object in the minimum scan time. On the other hand, a trans-illumination system places a limit on how close the corresponding illumination lens systems can be packed and still provide the desired matching of numerical apertures. This is because the object must be supported by a slide or other transparent member that must be sufficiently thick to provide mechanical stability. Where the illumination system must project light through a glass substrate 1 to 1.5 mm thick, the working distance cannot be greater than that amount. To have a sufficiently long illumination system working distance, while maintaining the same numerical aperture as the imaging system, the diameter of the lens of the illumination system must be larger than the diameter of the lens of the imaging element. This means that providing each imaging element with its own illumination element requires either that suboptimal imaging element packing or suboptimal numerical aperture matching must be employed.

Accordingly, there is an unfulfilled need for devices and methods for providing trans-illumination for arrays of imaging elements having respective optical axis, particularly array microscopes, without sacrificing either image element packing density or optimal numerical aperture matching.

SUMMARY OF THE INVENTION

The present invention meets the challenge of providing, in a multi-axis imaging system such as an array microscope, a single axis trans-illumination system that permits maximum packing of the imaging elements and optimum matching of the numerical aperture of the illumination system with the numerical aperture of the imaging elements while providing a practical working distance for the illumination system. Thus, a single optical system is provided for illumination, preferably having the same numerical aperture as the individual imaging elements and an exit pupil large enough to fill the collective contiguous fields of view of the imaging array. For Kohler illumination, the light source is imaged into the pupils of the arrayed elements of the imaging system. For critical illumination, the light source is imaged to the object plane of the imaging system, in which case the source must be large enough to fill the collective contiguous fields of view of the imaging array.

For dark-field illumination, an annular amplitude mask having a dark central portion is placed at the light source or a conjugate plane to the source. For phase contrast microscopy, annular phase masks are placed at the back focal planes of respective first, objective lenses in respective arranged imaging elements, or planes conjugate thereto; preferably, a corresponding annular amplitude mask is placed between the light source and the object at the front focal plane of a condenser lens in the illumination system. Similarly, for Hoffman modulation contrast microscopy, amplitude modulation masks are placed at the back focal planes of respective first, objective lenses in respective arrayed imaging elements, and slits are placed between the light source and the object at the front focal plane of a condenser lens on the illumination system. A mask may be employed in the illumination system to provide structural illumination or interferometric analysis. Similarly, a secondary source, such as a diffuser, may be provided to improve telecentricity or to modify the spatial or angular properties of the light.

Accordingly, it is a principle object of the present invention to provide novel systems and methods for trans-illumination in multi-axis imaging systems.

It is another object of the present invention to provide single-axis trans-illumination in an imaging system having a plurality of imaging elements with respective optical axes.

It is a further object of the present invention to provide single-axis trans-illumination in an array microscope.

The foregoing and other objectives, features and advantages of the invention will be more readily understood upon consideration of the following detailed description of the invention, taken in conjunction with the accompanying drawings.

DETAILED DESCRIPTION OF PREFERRED EMBODIMENTS

The illumination systems and methods of the present invention are adapted for use with mult-axis imaging systems, particularly microscope arrays, and more particularly array microscopes. Array microscopes, which are a recent development, may be used, for example, to scan and image entire tissue or fluid samples for use by pathologists. Individual imaging elements of array microscopes are closely packed and have a high numerical aperture. This enables the capture of high-resolution microscopic images of the entire sample in a short period of time by scanning the specimen with the array. It also presents novel illumination challenges which are met by the present invention.

1. Microscope Arrays

Figure 1:
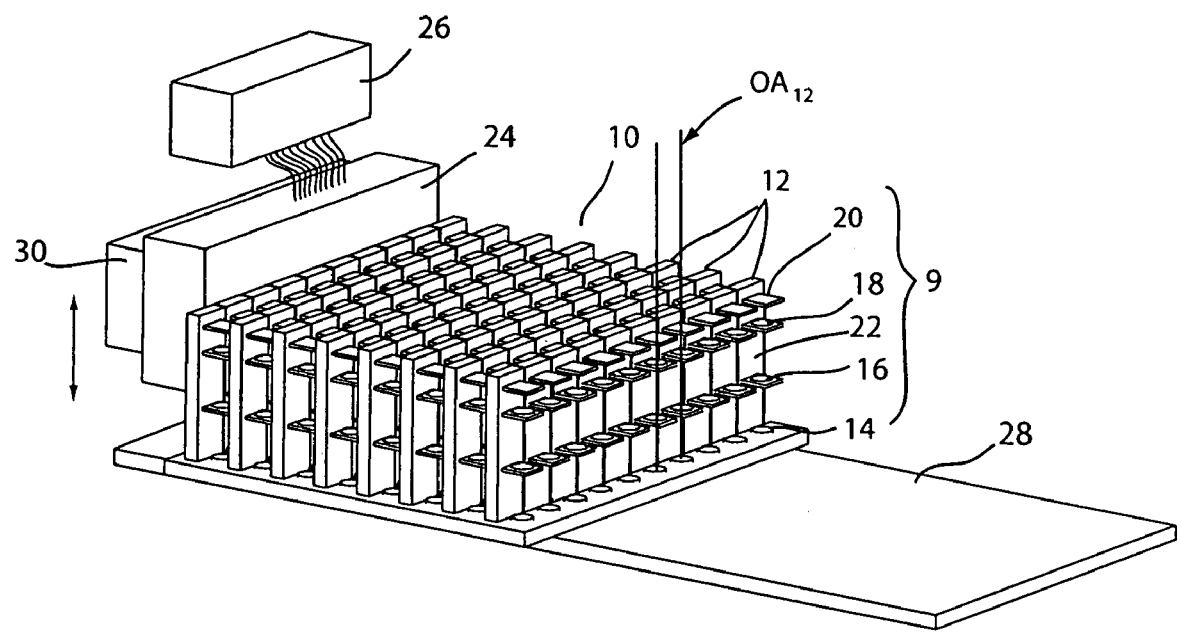
FIG. 1 is a perspective view of a first exemplary microscope array with which the present invention may be used.

An exemplary microscope array 10 is shown in FIG. 1. The microscope array 10 comprises an imaging lens system 9 having a plurality of individual imaging elements 12. Each imaging element 12 may comprise a number of optical elements, such as the elements 14, 16, 18 and 20. In this example, the elements 14, 16 and 18 are lenses and the element 20 is a detector, such as a CCD array. More or fewer optical elements may be employed. The optical elements are typically mounted on a vertical support 22 so that each imaging element 12 defines an optical imaging axis $OA_{12}$ for that imaging element.

The microscope array 10 is typically provided with a detector interface 24 for connecting the microscope to a data processor or computer 26 which stores the image data produced by the detectors 20 of the imaging elements 12. An object is placed on a stage or carriage 28 which may be moved beneath the microscope array so as to be scanned by the array. The array would typically be equipped with an actuator 30 for moving the imaging elements axially to achieve focus. The microscope array 10 would also include an illumination lens system, as explained hereafter.

Figure 2:
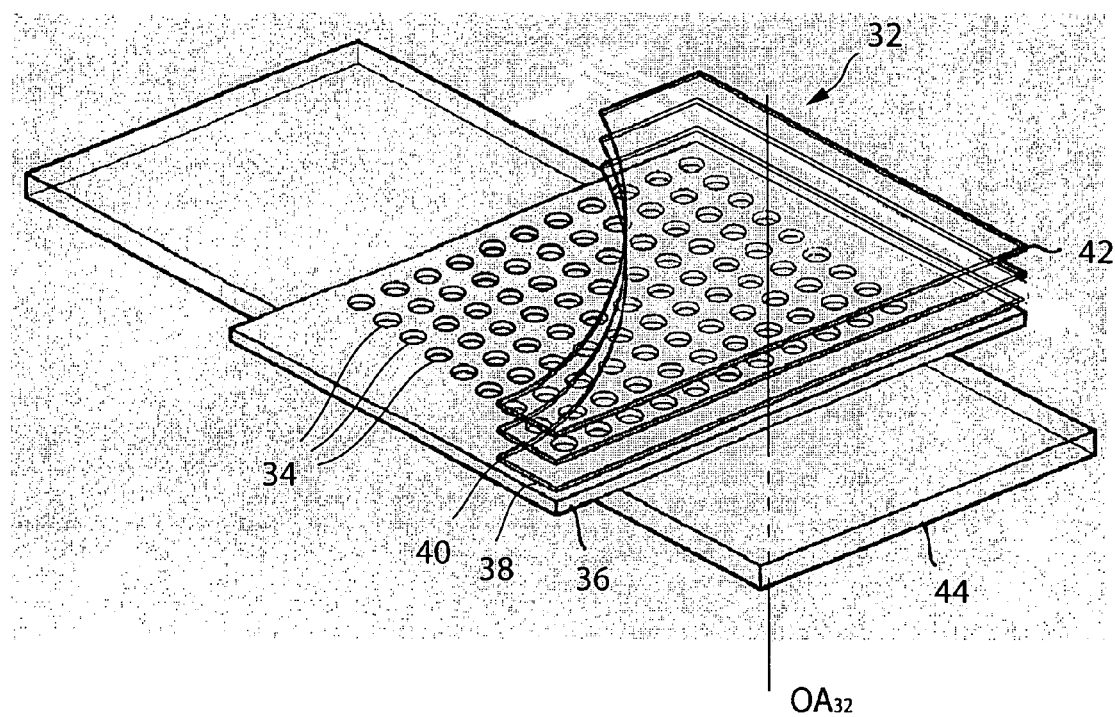
FIG. 2 is a perspective view of a second exemplary microscope array with which the present invention may be used.

Another embodiment of a microscope array 32 is shown in FIG. 2. In the imaging lens system, a plurality of lenses 34 corresponding to individual imaging elements are disposed on respective lens plates 36, 38 and 40, which are stacked along respective optical axes $OA_{32}$ of the imaging elements. Detectors 42 are disposed above the lens plate 40. As in the case of the microscope array 10, the microscope array 32 may be employed to scan a sample on a carriage 44 as the carriage is moved with respect to the array or vice versa.

Microscope arrays wherein the imaging elements are arranged to image respective contiguous portions of a common object in one dimension while scanning the object line-by-line in the other dimension are also known as an array microscope. Array microscopes may be used, for example, to scan and image entire tissue or fluid samples for use by pathologists. Individual imaging elements of array microscopes are closely packed and have a high numerical aperture, which enables the capture of high-resolution microscopic images of the entire specimen in a short period of time by scanning the specimen with the array microscope.

The detectors of array microscopes preferably are linear arrays of detector elements distributed in a direction perpendicular to the scan direction. As the imaging elements produce respective images that are magnified, each successive row of elements is offset in the direction perpendicular to the scan direction. This permits each imaging element to have a field of view that is contiguous with the fields of view of other appropriate positioned optical systems such that collectively they cover the entire width of the scanned object. The present invention is particularly suited for array microscopes; however, the present invention may be employed in other types of microscope arrays and multi-axis imaging systems having a plurality of elements for imaging respective locations in space.

Figure 3:
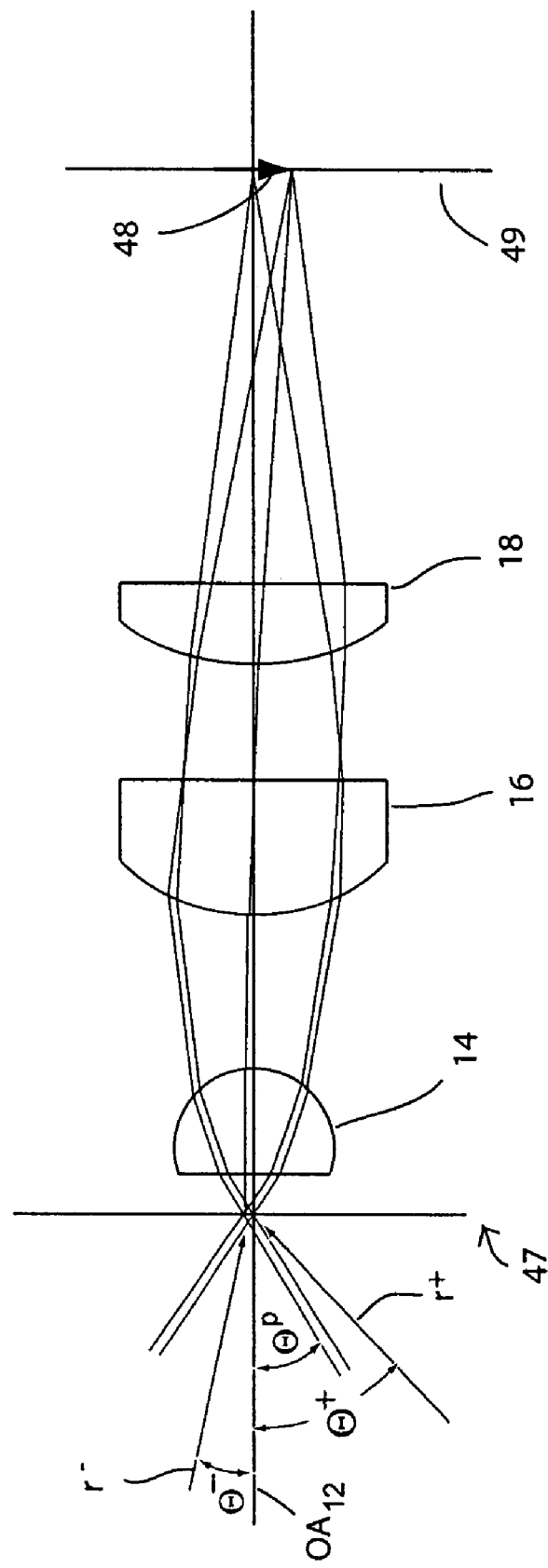
FIG. 3 is a ray trace diagram for an imaging element of the microscope array of either FIG. 1 or 2.

FIG. 3 is a ray trace diagram for an exemplary imaging element of the microscope arrays depicted in FIGS. 1 and 2. Each imaging element defines an object plane 47 and an image plane 49. An object 46 to be imaged is disposed on the object plane 47, and the detector 20 is disposed on the image plane 49. An illumination system (not shown in FIGS. 1 and 2) trans-illuminates the object 46. A first lens 14 collects light from a portion of the object 46, and the light propagates through lenses 16 and 18 to form an image 48 on the detector 20. The imaging elements are supported by the support 22 so that, preferably, the object and image planes of the multiple imaging elements 12 of the microscope array 10 (not shown in FIG. 3) combine to form a single coplanar object plane 47 and a single coplanar image plane 49 for the entire array.

Each imaging element 12, regardless of its complexity, establishes an acceptance angle $\Theta_p$ with respect to its optical axis. Rays of light incident on the object plane at angles $\Theta^+$ greater than the acceptance angle $\Theta_p$ will not, unless scattered by the object 46, contribute to the image 48. Conversely, if all of the rays of light incident on the object plane 47 are at angles $\Theta^-$ less than the acceptance angle $\Theta_p$, the object will be under-illuminated. Ideally, rays of illumination light should be incident on the face of the object at all angles less than or equal to the acceptance angle $\Theta_p$. That is, the numerical aperture of the illumination system should match the numerical aperture of the imaging element.

The remainder of this description is directed to various single-axis trans-illumination systems and methods for illuminating the object 46.

2. Kohler Illumination

Figure 4A:
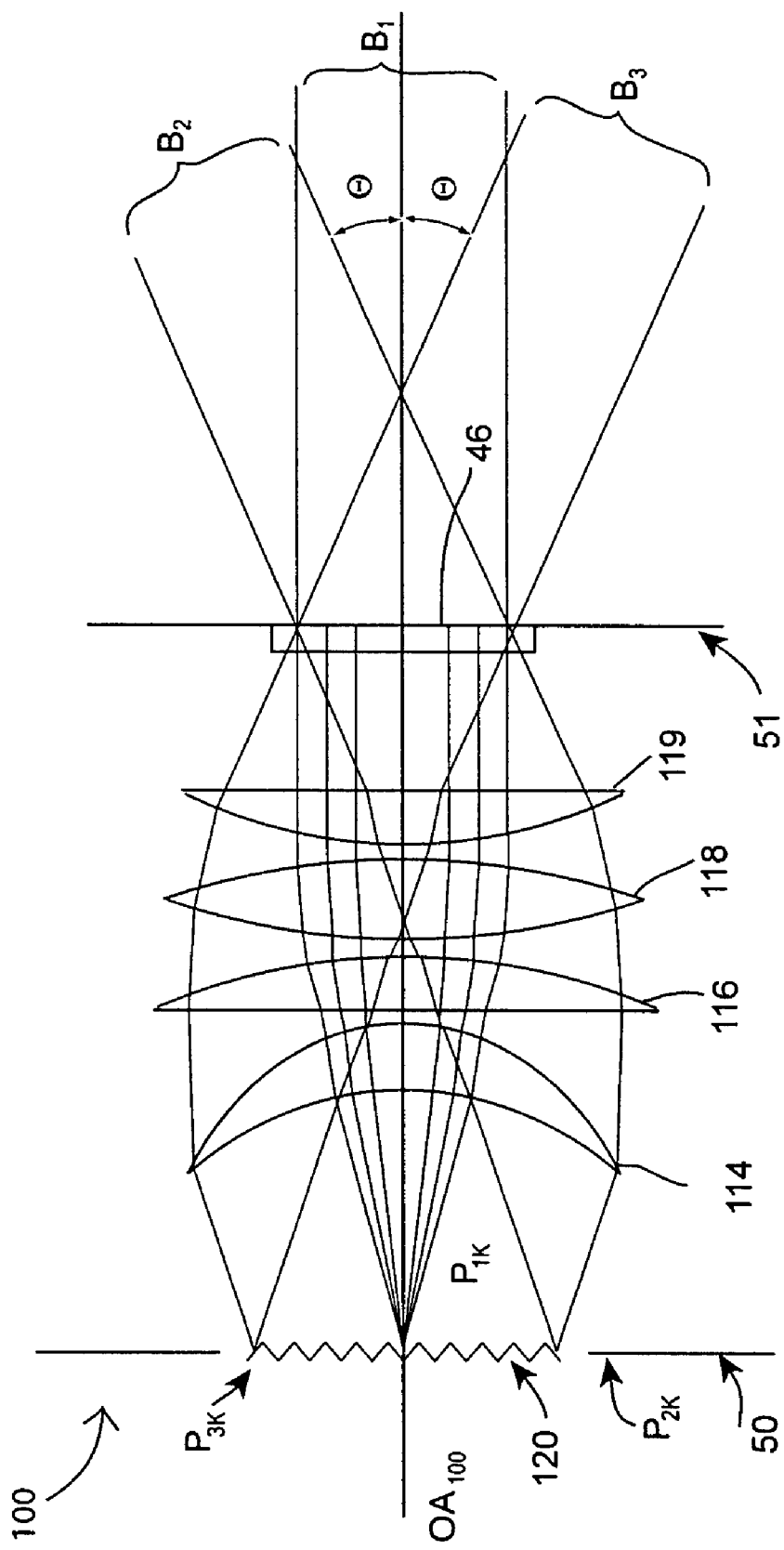
FIG. 4(a) is a ray trace diagram for a first embodiment of a Kohler illumination system for use with an array microscope according to the present invention.
Figure 4B:
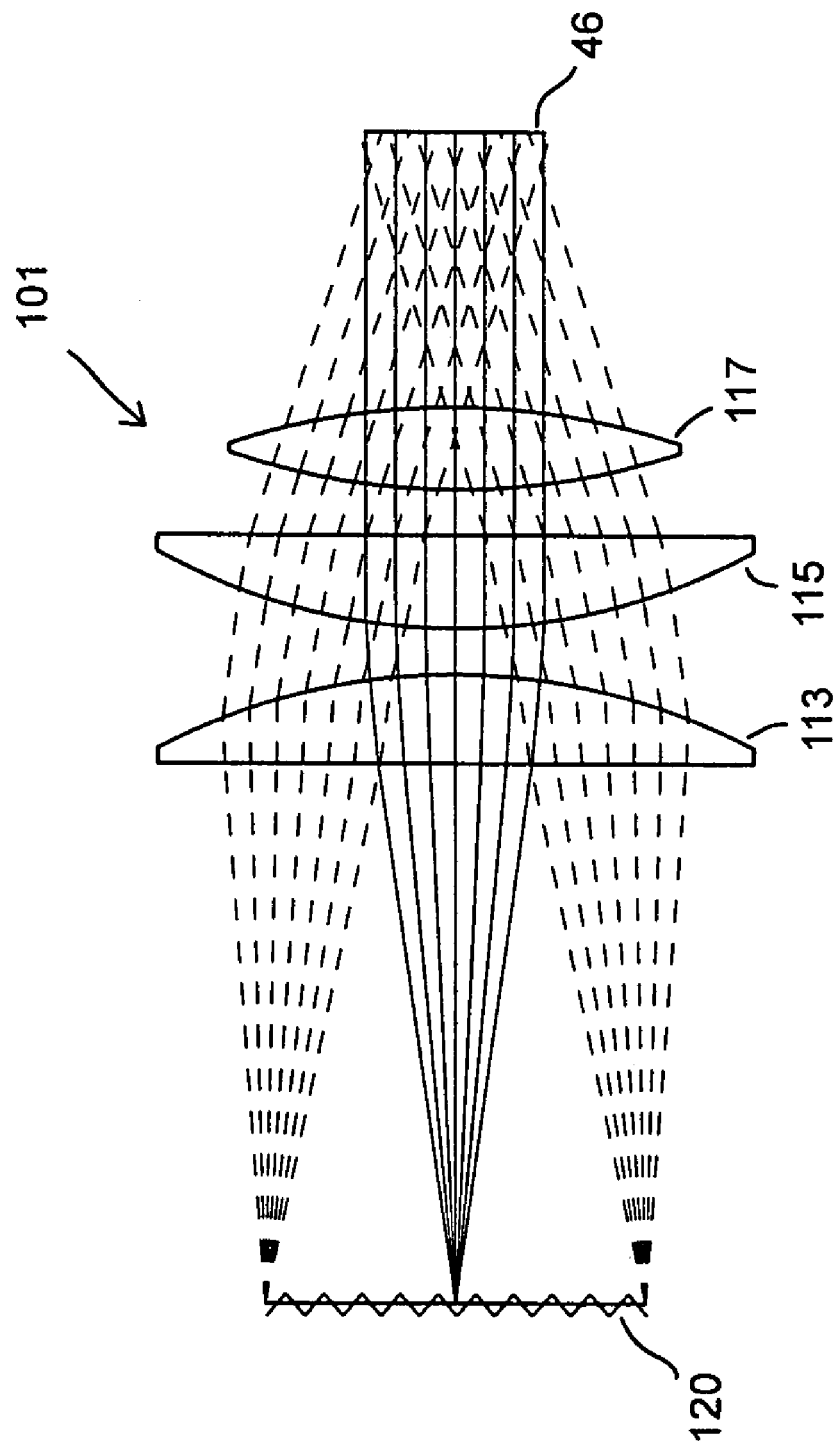
FIG. 4(b) is a ray trace diagram for a second embodiment of a Kohler illumination system for use with a microscope array according to the present invention.

Turning to FIG. 4(*a*), a Kohler illumination lens system 100 is shown according to the present invention. The illumination lens system may comprise a number of optical elements, such as the elements 114, 116, 118 and 119, and a light source 120. In this example, the elements 114, 116, 118 and 119 are lenses and the light source 120 may be any source of sufficient intensity, though a significantly extended source is preferred. More or fewer optical elements may be employed. For example, FIG. 4(*b*) shows an alternative illumination lens system 101, having three lens elements 113, 115 and 117. As is understood by those skilled in the art, any number of illumination lens system designs may be used, depending on the designer's goal, without departing from the principles of the invention. The optical elements of the illumination lens system are typically mounted on a support (not shown) or are part of a plate assembly as shown in FIG. 2 so as to be distributed along a single illumination optical axis $OA_{100}$ parallel to the optical axes of the imaging system. The light source is centered on the illumination system optical axis $OA_{100}$, at the front focal plane 50 of the illumination lens system, and the illumination lens system is disposed with respect to the imaging elements such that the image plane of the illumination system is placed at the entrance pupil of the imaging elements, or at a plane conjugate thereto.

For purposes of illustration of the principles of Kohler illumination, in FIG. 4(a) three points $P_{1k}$, $P_{2k}$, and $P_{3k}$ on the source 120 are shown. The point $P_{1k}$ is on the optical axis, and points $P_{2k}$ and $P_{3k}$ are symmetrically positioned about the illumination system optical axis at extreme ends of the source. Some of the light radiated from the point $P_{1k}$ enters the lens 114, is transmitted through the lenses 116, 118 and 119, and leaves the lens 119 as a collimated beam of light $B_1$. The light beam $B_1$ is parallel to the optical axis $OA_{100}$. Similarly, some of the light radiated from the point $P_{2k}$ enters the lens 114, is transmitted through the lenses 116, 118 and 119, and leaves the lens 119 as a collimated beam of light $B_2$, and some of the light radiated from the point $P_{3k}$ enters the lens 114 and leaves the lens 119 as a collimated beam of light $B_3$. The light beams $B_2$ and $B_3$ are incident on the object plane 51 of the imaging elements at respective illumination angles Θ with respect to the illumination optical axis $OA_{100}$. It will be appreciated that, since $P_{2k}$ and $P_{3k}$ represent points on the source at the extreme ends, and point $P_{1k}$ represents a point on the source that is centrally disposed therebetween, the lens system 100 will produce similar collimated beams for points between the points $P_{2k}$ and $P_{3k}$ having angles varying between +/−Θ. Any light that is incident on the object plane 51 at an angle greater than the illumination angle Θ corresponds to stray light and not light produced by the source 120.

Returning to FIG. 3, as mentioned previously, each imaging element 12 establishes an acceptance angle $Θ_p$ with respect to the optical axis $OA_{12}$ of the imaging element. Rays of light $r^+$ incident on the object plane at angles $Θ^+$ greater than the acceptance angle $Θ_p$ will be excluded by the imaging element 12, and rays of light $r^-$ incident on the object plane 47 at angles $Θ^-$ equal to or less than the acceptance angle $Θ_p$ will pass into the imaging element and therefore contribute to the image produced thereby.

When the illumination lens system 100 is related to a single imaging element 12, it will be appreciated that the illumination angle Θ of the illumination lens system works in concert with the acceptance angle $Θ_p$ of the imaging lens system 12 shown in FIG. 3. In particular, matching these angles avoids projecting light that is unnecessary for illuminating the object, which would occur if the illumination angle were greater than the acceptance angle, while at the same time provides all the light that is necessary to illuminate the object, which would not occur if the illumination angle were less than the acceptance angle.

As mentioned above, the present inventor has recognized that it is not ideally desirable to provide an individual illumination lens system 100 for each single imaging element 12 of a microscope array, particularly in an array microscope. In addition to the absolute limitations that this strategy places on the optical performance of the system, it is also costly to implement. It is therefore an outstanding recognition of the present inventors that the physics just described applies equally well to provide a single illumination lens system 100 for any number of the imaging elements 12 simultaneously, wherein the optical axes of the imaging elements are parallel or can be made to be parallel.

Figure 5:
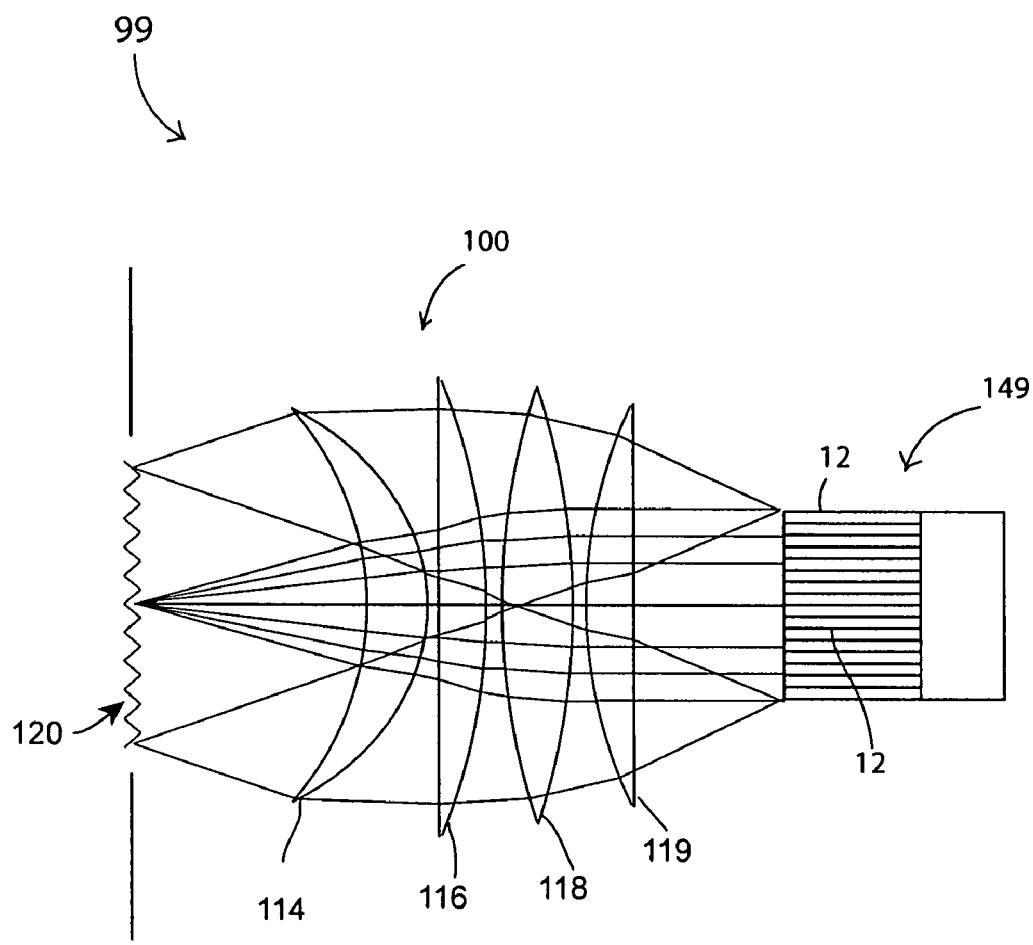
FIG. 5 is a ray trace diagram showing the illumination system of FIG. 4(a) for use in an array microscope such as that shown in either FIG. 1 or 2.

FIG. 5 shows an array microscope 149, employing, for example, either of the microscope arrays 10 and 32, having a trans-illumination lens system 100 such as that shown in FIG. 4(a). As long as the optical axes of the imaging elements 12 in the array microscope are parallel, a single maximum illumination angle Θ can be made to match the acceptance angles $Θ_p$ of all the imaging elements. To ensure that all of the imaging elements are illuminated, the exit pupil of the illumination system should be at least as large as the collective contiguous fields of view of the imaging elements, that is, the diameter of the exit pupil should equal the effective diameter of the entrance pupil of the array microscope. While the light source may be any size and still fill the exit pupil in Kohler illumination, it should preferably be extended the full field of view of the illumination lens system so as to maximize illumination intensity of the object plane of the imaging system.

3. Critical Illumination

Figure 6:
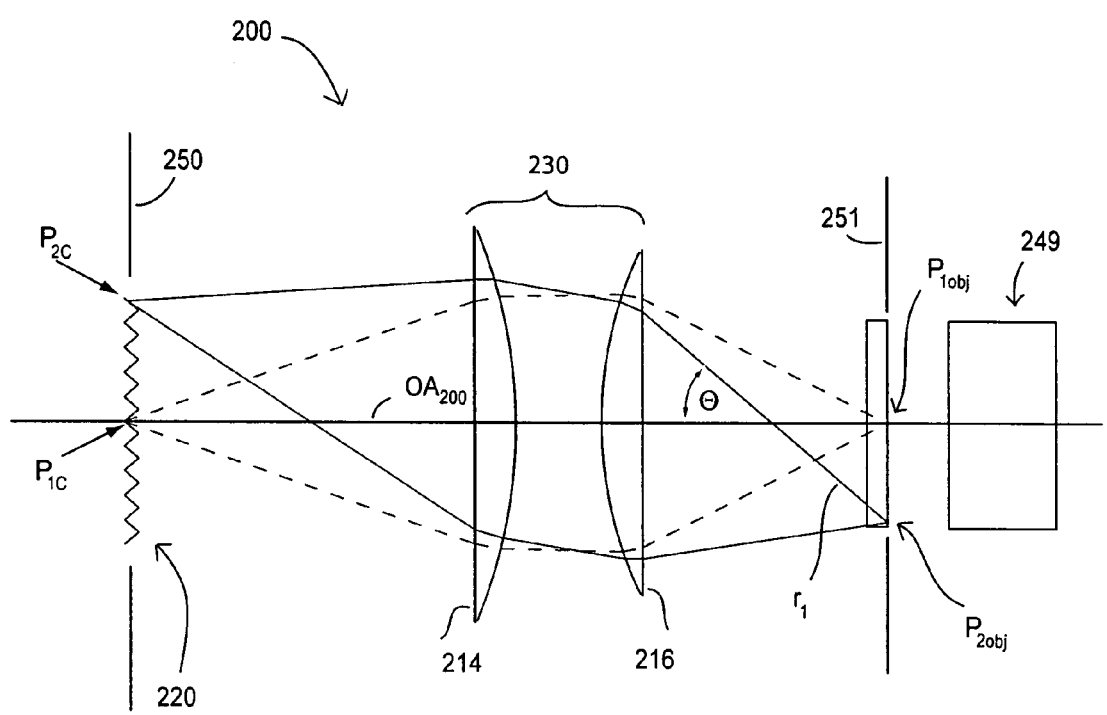
FIG. 6 is a ray trace diagram for a critical illumination system for use with an array microscope according to the present invention.

FIG. 6 shows an array microscope 249, employing, for example either of the microscope arrays 10 and 32, having a critical illumination lens system 230 according to the present invention. The illumination lens system 230 may comprise a number of optical elements, such as the elements 214 and 216, and a light source 220. In this example, the elements 214 and 216 are lenses and the light source 220 is preferably an LED array; however, the light source may be any source that is desired, provided that it provides the desired spatial intensity distribution. More or fewer optical elements may be employed. It may also be useful to provide for spatially dependent wavelengths or □colors□ by providing that different light emitting diodes in the array emit light at different wavelengths.

The optical elements of the illumination lens system are ordinarily mounted on a common support (not shown) along an illumination optical axis $OA_{200}$ parallel to the imaging system optical axes or are part of a plate assembly. The light source is placed on the illumination optical axis, at an object plane 250 of the illumination lens system. The corresponding image plane is shown at 251, which is also the object plane of the imaging system 249. Thus, the light source is imaged to the object plane of the imaging system.

For purposes of illustration of the principles of critical illumination, two points $P_{1c}$ and $P_{2c}$ on the source 220 are shown. Point $P_{2c}$ is located at an extreme end of the source and point $P_{1c}$ is centrally located on the optical axis of the illumination system. As shown, all the light transmitted from the point $P_{1c}$ that is collected by the lens 214 is mapped to the point $P_{1obj}$ on the object plane 251. Similarly, all the light transmitted from the point $P_{2c}$ that is collected by the lens 214 is mapped to the point $P_{2obj}$. It will now be appreciated that the lens system 230 maps the source onto the object plane, and adjusting the size and lateral position of the source can provide for precisely mapping the source onto an object at the object plane.

The ray $r_1$, from the point $P_{2c}$, defines a maximum illumination angle Θ with respect to the illumination optical axis $OA_{200}$ as it passes through and beyond the object plane 251. Considering that there is a symmetrically disposed ray (not shown) corresponding to another point on the source at its opposite extreme end, it will be appreciated that the maximum illumination angle for the system will be +/−Θ. Any light that is incident on the object plane 251 at an angle greater than the illumination angle Θ corresponds to stray light and not light produced by the source 220. As with Kohler illumination, it is highly desirable to match the illumination angle Θ of the illumination lens system with the acceptance angles $Θ_p$ (FIG. 3) of each of the individual imaging elements in the imaging lens system 249. As long as the optical axes of the imaging elements are parallel, a single maximum illumination angle Θ can be made to match the pass angles $Θ_p$ of all the imaging elements.

As for Kohler illumination, an array microscope having multiple imaging elements and employing critical illumination may be provided with a corresponding array of illumination lens systems; however, it is an outstanding recognition of the present inventor that it is both desirable and feasible to employ a critical illumination lens system characterized by a single optical axis in an array microscope having an imaging array characterized by multiple optical axes.

As in the case of Kohler illumination, the exit pupil size of the illumination system needs to be at least as large as the effective entrance pupil size of the array microscope. In addition, in critical illumination, the light source must be large enough that the image of the source produced at the object plane of the imaging system must be at least as large as the effective entrance pupil of the array microscope to ensure that all of the imaging elements are illuminated.

Figure 7:
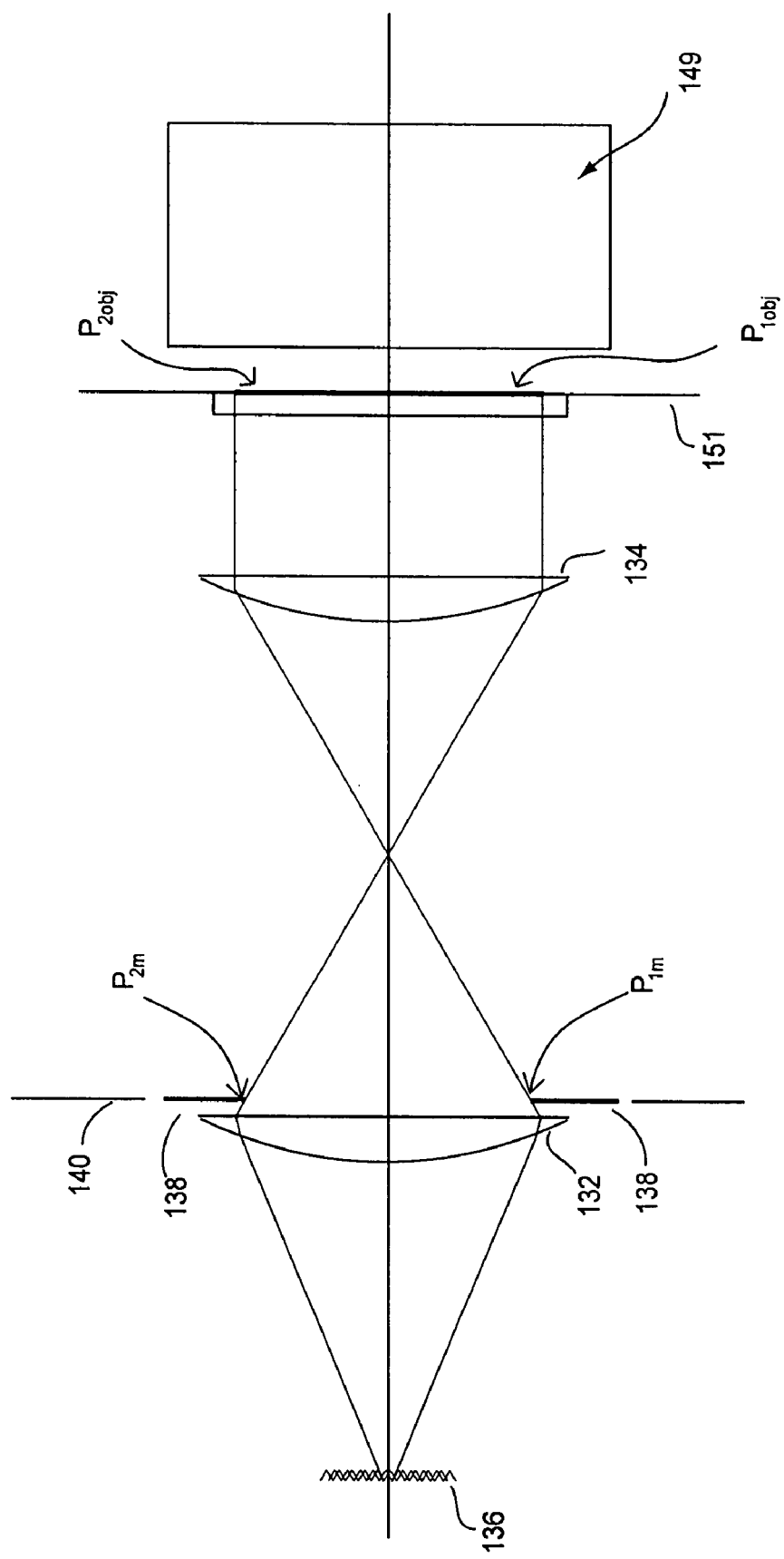
FIG. 7 is a ray trace diagram for a Kohler illumination system including an aperture mask according to the present invention.

The size or position of the area to be illuminated can be adjusted in either Kohler or critical illumination for an array microscope. For example, FIG. 7 shows a Kohler illumination lens system 130 comprising lens elements 132 and 134, a light source 136, and an aperture mask 138. The aperture mask is placed at an object plane 140 of the lens system 134, and its mage is formed at the plane 151. Effectively this stop acts as aperture stop for the illumination system 130 and as field stop for the imaging system 149. In the example, the aperture mask stops light above the point $P_{1m}$ and stops light below the point $P_{2m}$ to limit the size of the illuminated area at the object plane 151 to the area between the points $P_{1obj}$ and $P_{2obj}$. Essentially, the aperture mask is imaged at the object plane of the imaging system 149, and may be placed at the object plane 140, in from of the lens 132 in this case, for projection onto the object plane.

4. Dark Field Illumination

In dark field illumination, illuminating light is provided only at illumination angles that exceed the acceptance angle of the imaging lens system. Accordingly, predominately only illuminating light that has been scattered by the object is permitted to enter the imaging lens system. Some of the scattered light will be directed toward the imaging lens system at angles less than or equal to the acceptance angle of the imaging lens system and, therefore, will contribute to illuminating the object.

Figure 8A:
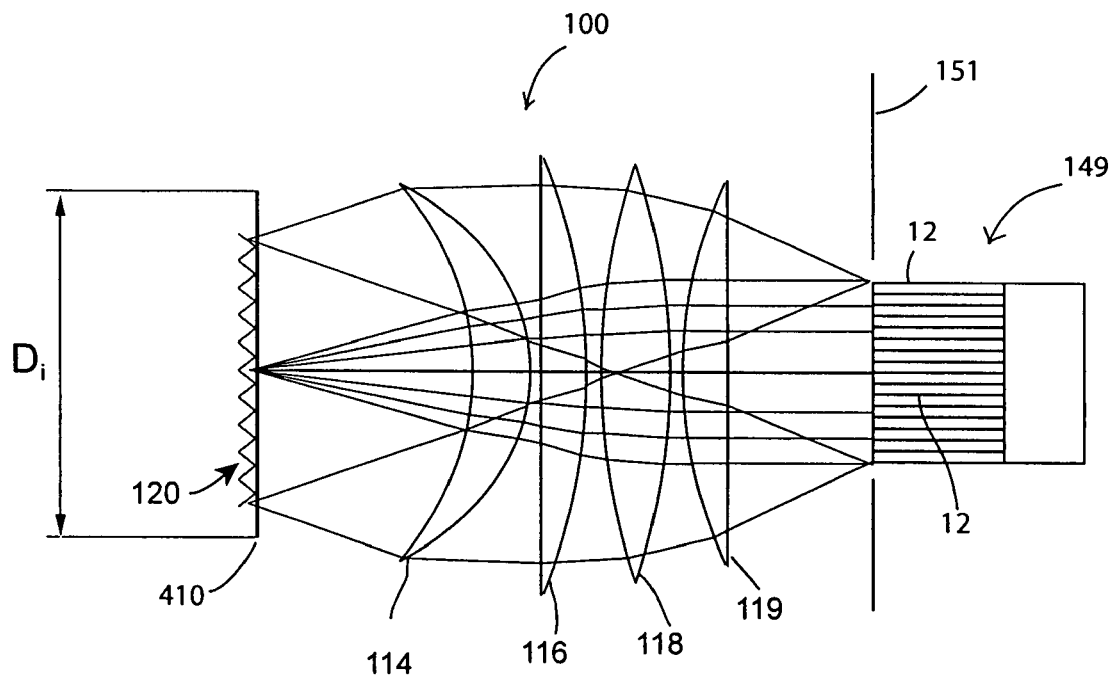
FIG. 8(a) is a ray trace diagram of the Kohler illumination system of FIG. 4(a) shown with an amplitude mask for dark field illumination according to the present invention.
Figure 8B:
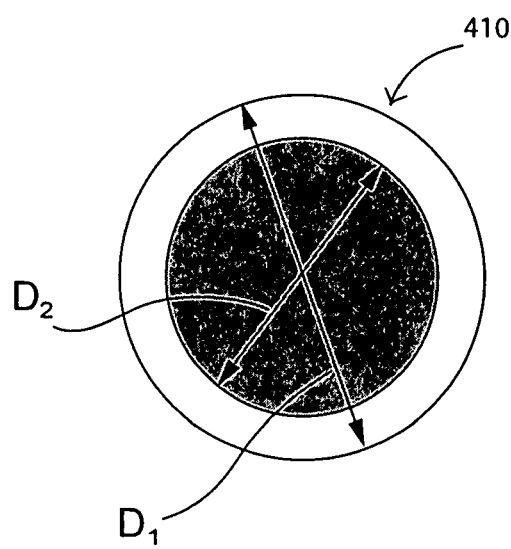
FIG. 8(b) is a plan view of the amplitude mask of FIG. 8(a).

Turning to FIGS. 8(a) and 8(b), the array microscope 149 of FIG. 5 is shown with an amplitude mask 410 disposed immediately behind the source 120 to provide dark field trans-illumination according to the present invention. The mask 410 varies the intensity of light leaving the source according to a predetermined pattern. The amplitude mask is most simply provided as being opaque within the diameter $D_2$ and transmissive outside this diameter, such as between the diameters $D_1$ and $D_2$, to block the projection of all light from the source that would be incident on the object plane 151 at an angle less than or equal to the acceptance angle $\Theta_p$ of the imaging lens system, and to pass light from the source that would be incident on the object plane at angles greater than the acceptance angle. The light passed by the amplitude mask will therefore be incident on the imaging lens system at an angle that is too great to enter the imaging lens system unless the light interacts with the object such that its angle of orientation is modified to being within the acceptance angle, that is, unless the light is scattered by the object.

Alternatively, the source itself may be a ring-shaped source, for example, a circular array of light emitting diodes. In this case a mask is unnecessary to produce dark field illumination.

As for Kohler and critical illumination generally, an array microscope having multiple imaging elements and employing dark field illumination may be provided with a corresponding array of illumination lens systems; however, it is an outstanding recognition of the present inventor that it is both desirable and feasible to employ an illumination lens system providing dark field illumination characterized by a single illumination optical axis in an array microscope having an imaging array characterized by multiple optical axes.

5. Phase Contrast Illumination

Figure 9A:
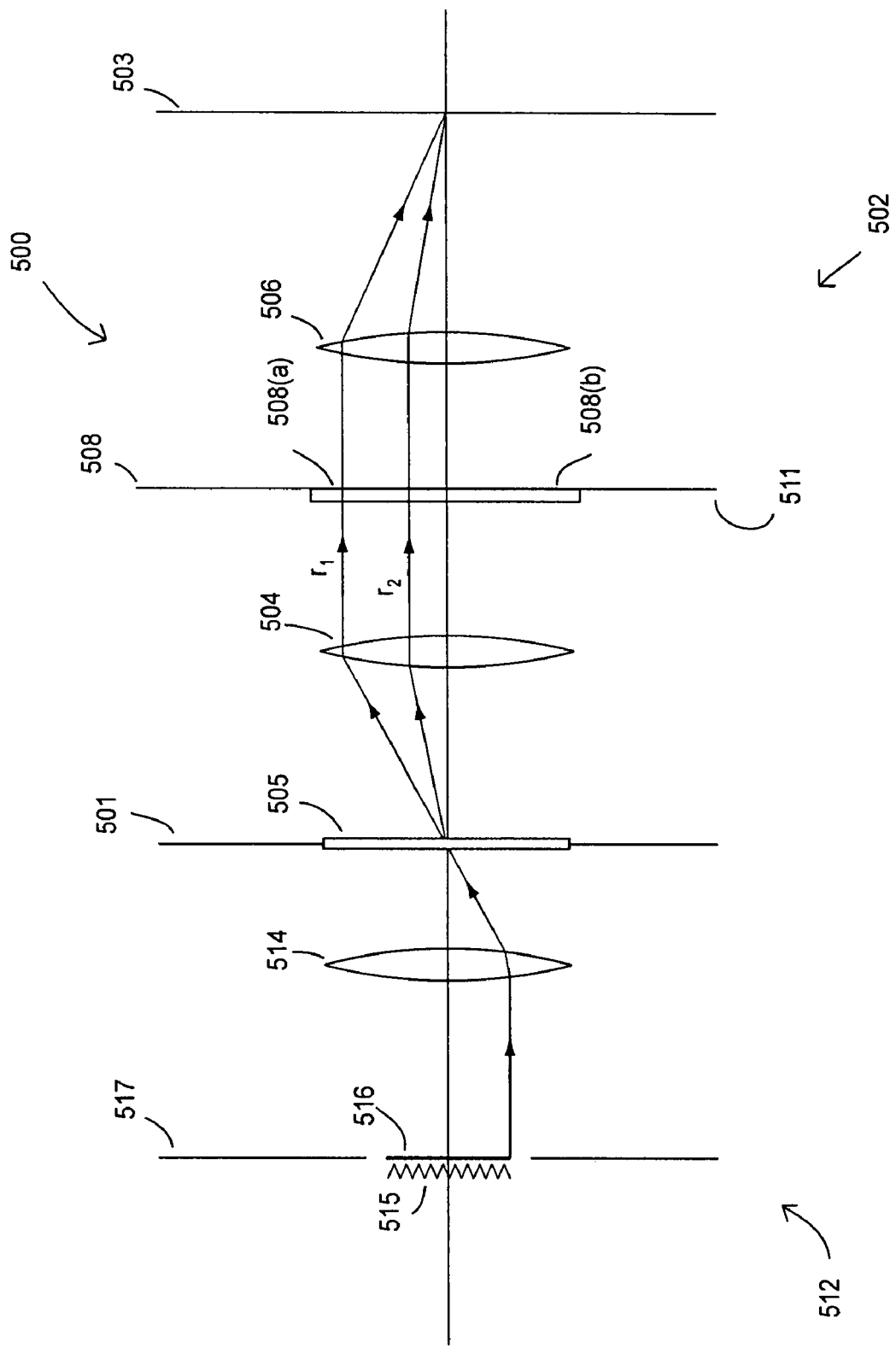
FIG. 9(a) is a ray trace diagram for a microscope system illustrating principles of phase contrast microscopy.

Phase contrast illumination contrasts differences in the phase of light as it travels through different parts of the object to be imaged, particularly by converting changes in phase into changes in light intensity. For example, FIG. 9(a) shows a schematic diagram for a microscope system 500 employing phase contrast illumination. The system has an object plane 501 at which an object to be viewed is disposed. The microscope includes an imaging system 502 comprising a first lens 504 and a second lens 506, and an illumination system 512 comprising a condenser lens 514 and a light source 515. An object 505 at the object plane 501 is imaged onto the image plane 503 by the lenses 504 and 506. To provide the features of phase contrast microscopy, the illumination system further comprises a phase shifting mask 508, and preferably, a ring-pattern amplitude mask 516. The phase shifting mask 508 is placed, in the imaging lens system, at the back focal plane 511 of the first lens 504, or a plane conjugate thereto between the object plane 501 and image plane 503 of the imaging system. Alternatively, the positions of the amplitude and phase delay masks may be reversed.

Preferably, the phase shifting mask has a ring-shaped pattern 508(a) that retards the light represented by ray $r_1$, that propagates therethrough by one-quarter wavelength with respect to the light represented by ray $r_2$ that is refracted by the object 505 and passes through the central position 508(b). Light that propogates through the object will experience phase variations. Interference will occur between the light that passes through the center of the mask and the light that passes through the ring, thereby converting the phase variations to amplitude contrast, as is understood by persons skilled in the art.

An amplitude mask 516 is placed, in the illumination lens system, between the light source 515 and the object plane 501 of the imaging system at the front focal plane 517 of the condenser lens 514 or, in a multi-lens system, a plane conjugate thereto to vary the intensity of light leaving the source according to a predetermined spatial pattern. Preferably, the pattern comprises a transparent ring 519(a), and opaque central and outer portion 519(b) and 519(c), respectively, to match the phase-shifting mask 508 between the object plane 501 and image plane 503 of the imaging system.

Figure 9B:
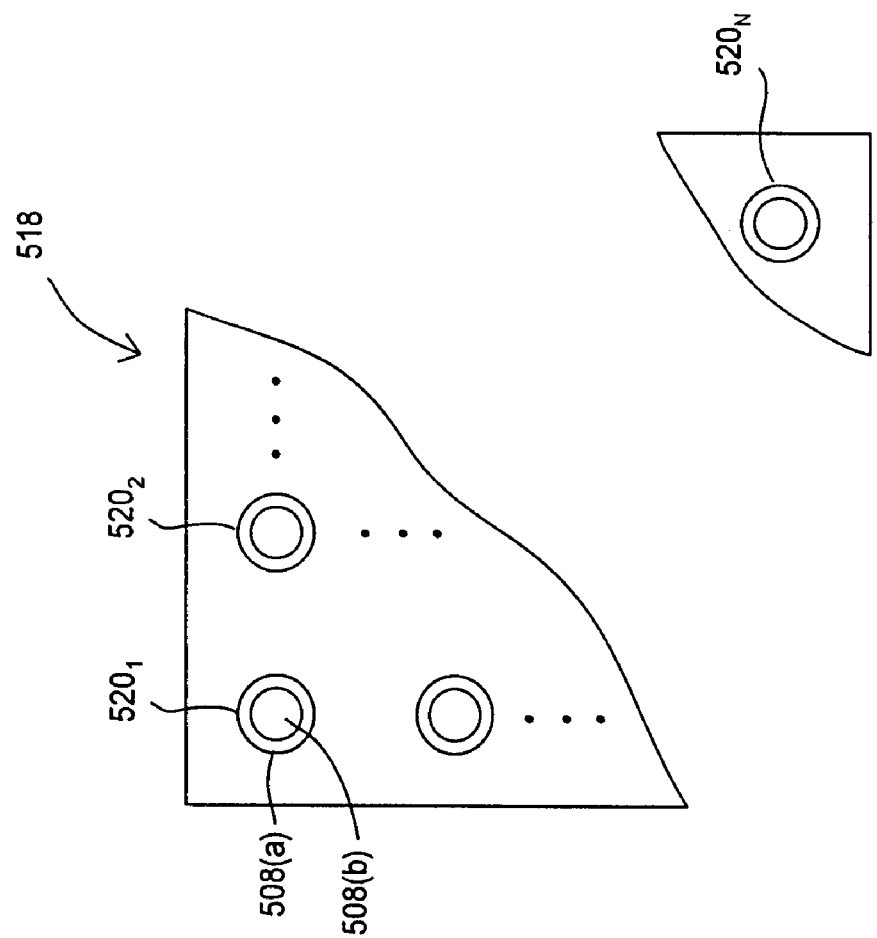
FIG. 9(b) is a plan view of a phase-shifting array for use with a microscope array for phase contrast microscopy according to the present invention.

For an array microscope according to the present invention, an array 518 of phase shifting masks corresponding to the array of imaging elements in the microscope and having respective ring-shaped patterns $520_1$, $520_2$ . . . $520_N$ is provided, as shown in FIG. 9(b). These masks can be provided as discrete optical elements as, for example, in the case of the microscope array 10 shown in FIG. 1. In the case of the array microscope 32 shown in FIG. 2, it is preferable to provide the masks as an array formed on a single layer of material. Patterned phase masks may be formed using lithographic or photographic techniques. This provides a significant manufacturing advantage over the provision of separate masks for each imaging element.

6. Hoffman Modulation Contrast Illumination

Figure 10:
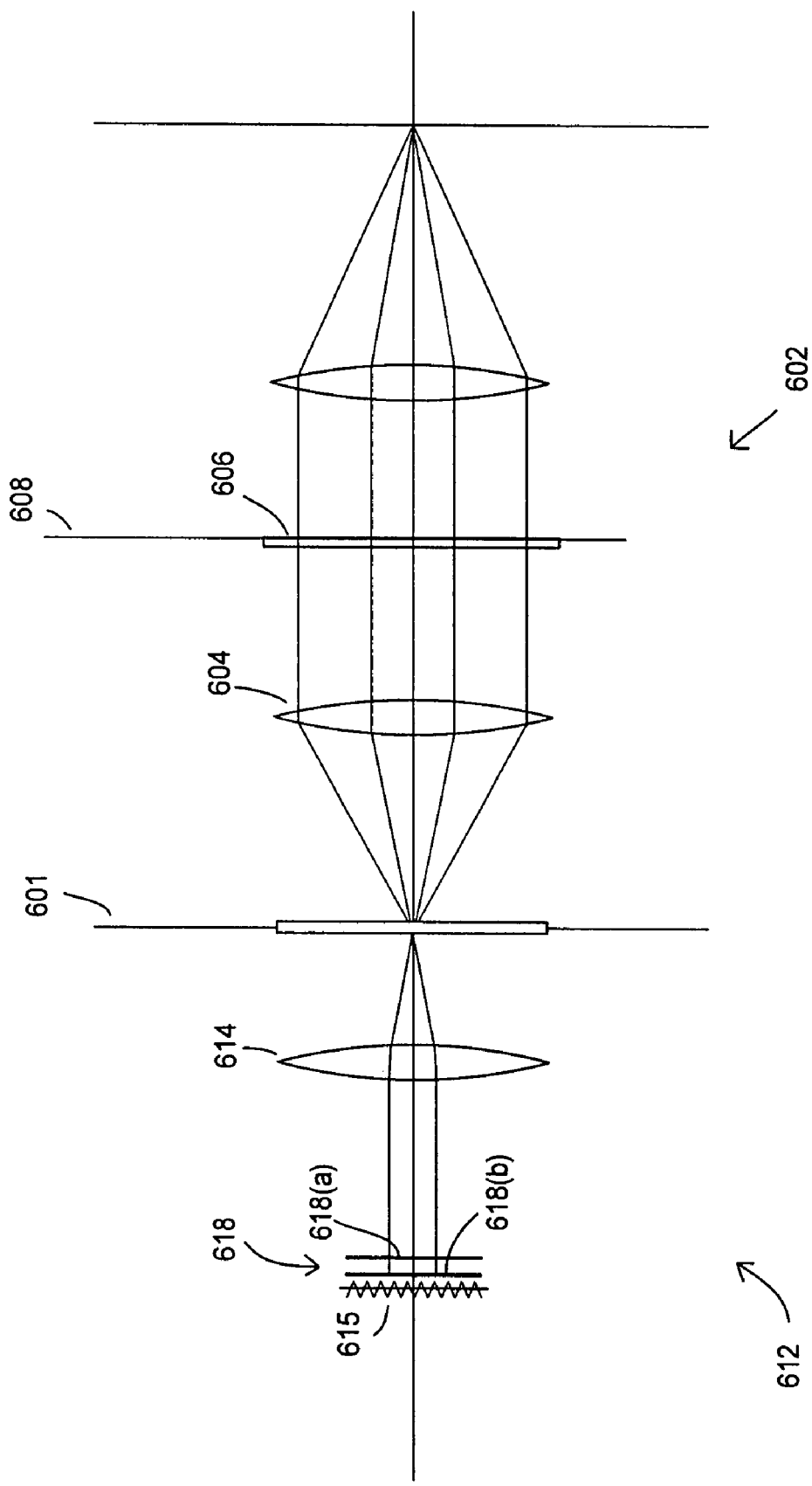
FIG. 10 is a ray trace diagram of a microscope system illustrating principles of Hoffman modulation contrast microscopy.

Hoffman modulation contrast illumination contrasts differences in optical gradients in the object, particularly by converting the optical gradients into variations in light intensity. FIG. 10(a) shows a schematic diagram of a Hoffman modulation microscope element 600 having an object plane 601 for viewing an object disposed thereon. The basic microscope element includes an imaging system 602 comprising an objective lens 604, and an illumination system 612 comprising a condenser lens 614 and a source of light 615. To provide the features of Hoffman modulation contrast, the imaging system further comprises an amplitude mask 606, and the illumination system further comprises a slit mask 618. Additional optical elements may also be employed in either or both lens systems.

Figure 11A:
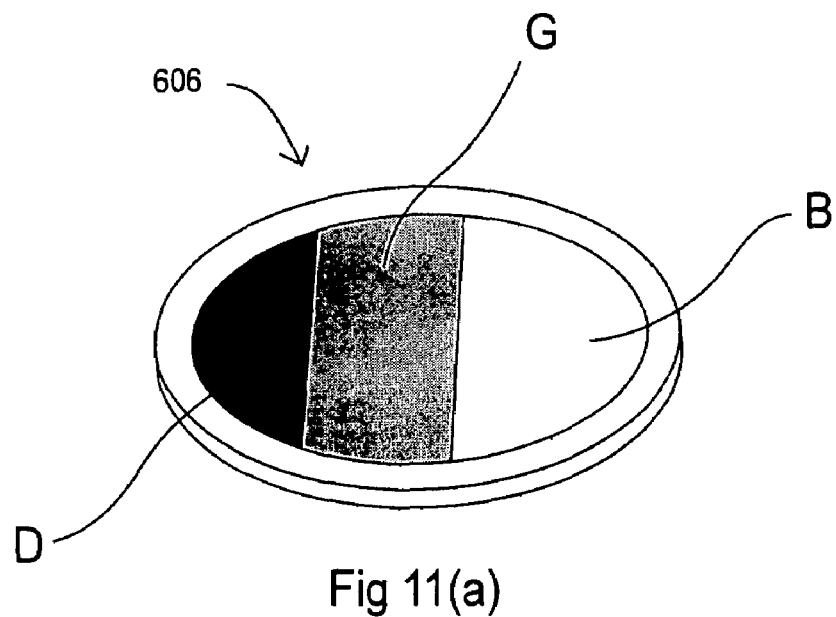
FIG. 11(a) is a plan view of one element of a symmetrical amplitude mask for Hoffman modulation contrast microscopy according to the present invention.
Figure 11B:
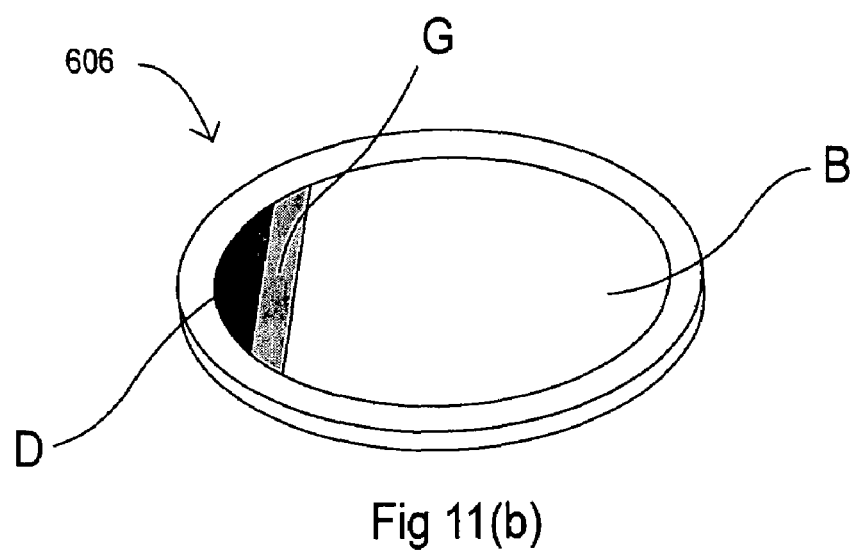
FIG. 11(b) is a plan view of one element of an asymmetrical amplitude mask for Hoffman modulation contrast microscopy according to the present invention.
Figure 12A:
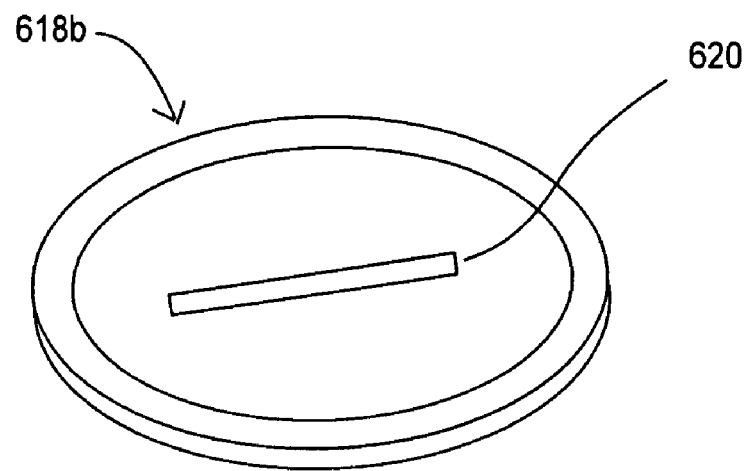
FIG. 12(a) is a plan view of a symmetrical slit mask for use with the amplitude mask of FIG. 11(a) according to the present invention.
Figure 12B:
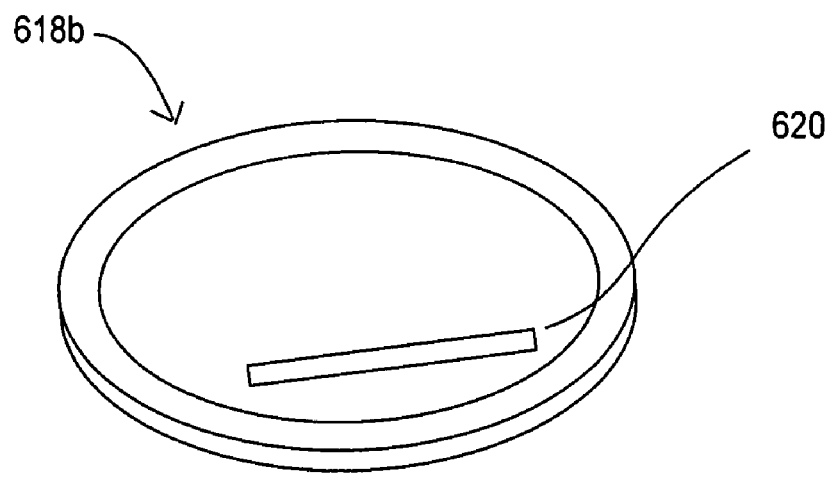
FIG. 12(b) is plan view of an asymmetrical slit mask for use with the amplitude mask of FIG. 11(b) according to the present invention.

The amplitude mask 606 is placed on a back focal plane 608 of the objective 604, and varies the intensity of light leaving the source according to a predetermined pattern. FIGS. 11(a) and 11(b) illustrate the construction of alternative such masks for use in a standard microscope, and FIGS. 12(a) and 12(b) illustrate corresponding slits. The mask may have, e.g., three distinct "zones" "D", "G", and "B" providing for varying light intensity. In the example shown, the area "D" transmits 1% of light incident on thereon, area "G" transmits 15% of the light incident on thereon, and area "B" transmits 100% of the light incident on thereon. Unlike the phase plate employed in phase contrast microscopy, the mask is adapted so that it does not alter the phase of light passing through any of the zones.

The slit mask 618 is preferably provided with a circular polarizing portion 618a and a slit portion 618b with polarizing material in a slit 620 therethrough. With this construction, the effective width of the slit 620 can be adjusted by rotating the polarizing portion 618a of the slit mask and the slit portion 618b with respect to each other. FIGS. 12(a) and 12(b) show slit masks 618b corresponding to the amplitude masks 606 of FIGS. 11(a) and 11(b), respectively.

The principle of Hoffman modulation contrast spectroscopy is that light from the source passes through the slit and then through an object characterized by phase gradients. These gradients deflect polarized light, according to the direction and strength of the gradient, into one of the clear, grey and dark zones of the amplitude mask. The gradient is therefore transformed into a predetermined contrast. The differences in contrast due to different optical gradients provides a desirable shadowed, "pseudo-relief" effect. The slit elements are placed at the actual or virtual source 615. Kohler illumination is the preferred form of illumination used in Hoffman modulation contrast spectroscopy.

The relative sizes of the zones of the amplitude mask 606 may vary, as can be seen for example by comparing FIGS. 11(a) and 11(b). Moreover, their symmetry may also vary. FIG. 11(a) shows a symmetric amplitude mask 606 and FIG. 12(a) shows the corresponding symmetric slit polarizer 618, where both the gray zone of the mask 606 and the slit are centered on the optical axis of the microscope element. On the other hand, FIG. 11(b) shows an asymmetrical amplitude mask and FIG. 12(b) shows a corresponding offset slit and polarizer. The resolution of the offset system is improved over that of the symmetric system.

As for Kohler and critical illumination generally, an array microscope having multiple imaging elements and employing Hoffman modulation contrast illumination may be provided with a corresponding array of illumination lens systems; however, it is an outstanding recognition of the present inventor that it is both desirable and feasible to employ an illumination lens system providing Hoffman modulation contrast illumination characterized by a single optical axis in an array microscope having an imaging array characterized by multiple optical axes.

For an array microscope according to the present invention, it is necessary to provide an array of the amplitude masks 606 corresponding to the array of imaging elements in the microscope, similarly to the array of phase masks for phase contrast microscopy, as shown in FIG. 9(b). These amplitude masks must be provided to operate coextensively with the back focal planes of all of the imaging elements. This can be accomplished by providing the masks as separate elements; however, as for the masks used in phase contrast illumination discussed above, it is preferable to provide the masks in a single sheet of material. The sheet of material may incorporate stepped and repeated mask images, which can be provided for the amplitude masks 606 using a photographic process.

In addition, more complex optical elements can be formed using photolithographic processes, particularly employing techniques for forming planar structures that are well known in the art of semiconductor device fabrication. One or more masks may be fabricated that have corresponding stepped and repeated images, the masks being used to photographically expose a substrate that is treated with a photoresist material, as will be understood by persons skilled in the art. The photoresist material defines a pattern for subsequent deposits or removals of material from the sheet, permitting the formation of layers having desired material characteristics. This form of construction provides a significant manufacturing advantage over the provision of separate masks for each imaging element. However, it is an outstanding advantage of the present invention that such techniques are not necessary to reduce costs in the illumination lens systems of array microscopes, since it has been recognized that an array of illumination optics is not required.

7. Structured Illumination and Interferometry

In many cases, it may be desirable to illuminate an object with a particular intensity pattern. This can be accomplished using critical illumination, by providing a particular intensity pattern of the source, and it can be accomplished as well with the use of amplitude or phase masks such as discussed above in connection with dark field trans-illumination and phase contrast microscopy. Another way to provide a particular illumination intensity pattern is to use a refractive illumination element in the optical path of the illumination elements and to provide that the optical surface of the refractive illumination element produces desired wavefront aberrations. Yet another way to provide such an intensity pattern is to use a source of coherent light and a hologram in the optical path of the illumination elements to produce a desired interference pattern at the object.

8. Secondary Source Illumination

Figure 13:
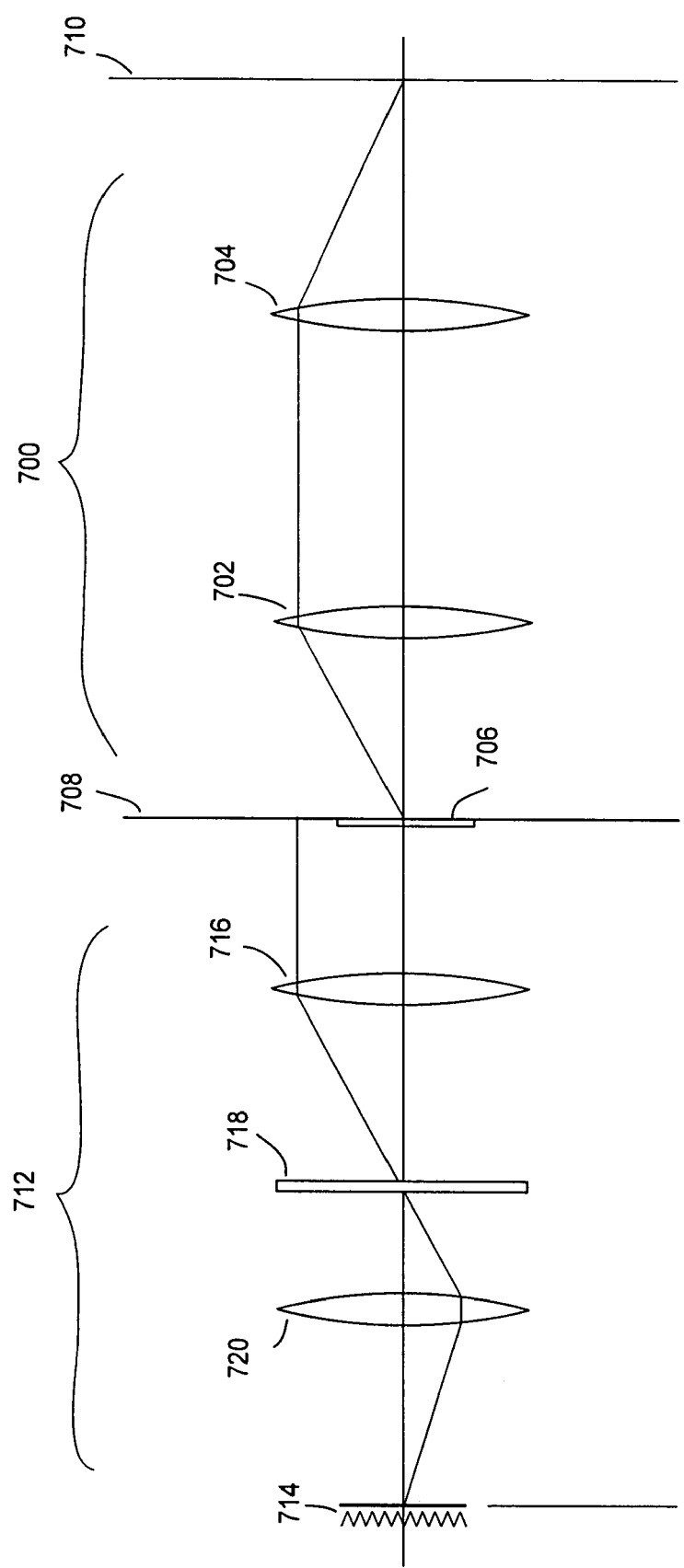
FIG. 13 is a ray trace diagram of a microscope array system employing a single-axis secondary source illumination system according to the present invention.

To fix the position of the light source so as to ensure that the illumination system is telecentric, or to modify the spatial and angular properties of the illumination light, it may be desirable to employ a secondary source, as shown in FIG. 13. As discussed above, an array microscope 700 comprises individual imaging elements having one or more lenses 702 and 704 that image a portion of an object 706 at object plane 708 onto an image plane 710. In the case of secondary illumination, a single axis illumination system 712 comprises a light source 714 and a condenser lens 716, as usual, but also comprises a secondary source optical element 718 for controlling the spatial and angular properties of the illumination light. The element may be for example, a diffuser, a hologram, phase or amplitude mask, a diffraction grating or other element designed to produce desirable properties. Ordinarily, the light source 714 is imaged by a lens 720 onto the secondary source element, which is placed at the front focal plane of the condenser so as to provide Kohler illumination, as shown in FIG. 13. However, the secondary source could also be imaged into the object plane of the imaging system for critical illumination.

While some specific embodiments of a trans-illumination system for an array microscope have been shown and described, other embodiments according with the principles of the invention may be used to the same or similar advantage. It is a general recognition of the present inventors that the desirability and feasibility of using a single illumination lens system characterized by a single optical axis with an imaging array having multiple optical axes applies to known illumination techniques in addition to those discussed. It should be noted that any desired light emitting device or element may be used as a source of light according to the present invention, in addition to the incandescent bulb, LED and coherent sources mentioned, such as but not limited to a fiber bundle, diffuser and beam homogenizer.

Figure 14:
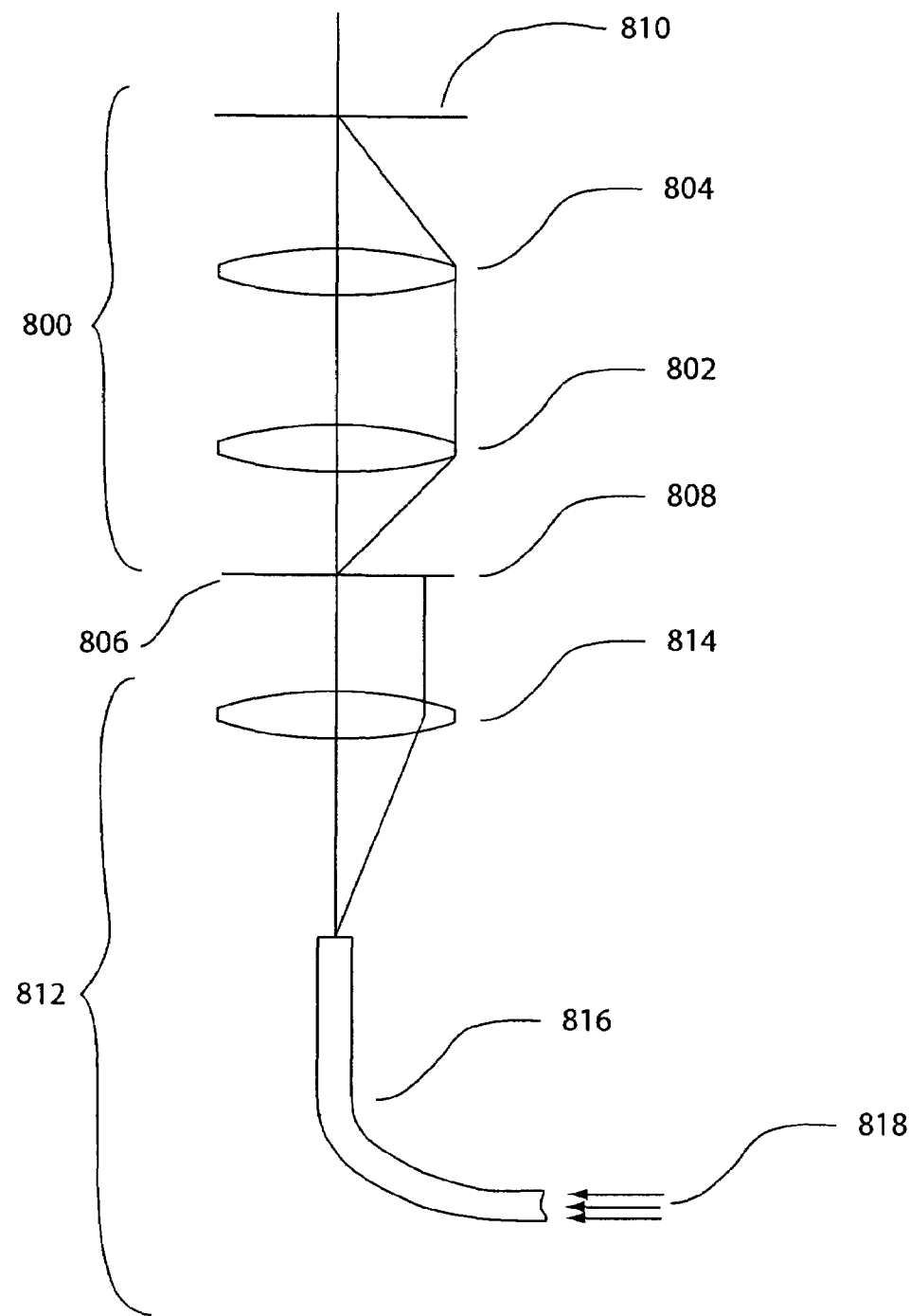
FIG. 14 is a ray trace diagram of a microscope array system employing a single axis illumination system having a fiber bundle as the source of light according to the principles of the present invention.

For example, FIG. 14 is a ray trace diagram of a microscope array system employing a single axis illumination system employing a fiber bundle as the source of light. As discussed above, an array microscope 800 comprises individual imaging elements having one or more lenses 802 and 804 that image a portion of an object 806 at object plane 808 onto an image plane 810. The single axis illumination system 812 comprises a condenser lens 814 and, as a source of light, a fiber bundle 816 into which light 818 is launched by any convenient means appropriate for the application.

Moreover, source radiation other than visible light may be employed without departing from the principles of the invention.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims that follow:

The invention claimed is:

1. A single-axis trans-illumination system in a multi-axis imaging system, comprising:
   a multi-axis imaging system having an object plane and a plurality of laterally-distributed imaging elements for producing respective images of respective areas of an object located at the object plane, the imaging elements having respective lenses, optical imaging axes, and fields of view, said optical axes being spaced apart from one another;
   a light source; and
   an illumination subsystem disposed between the light source and the object plane of the imaging system for directing light from said light source toward the imaging elements, the illumination subsystem having a single optical illumination axis, wherein said optical illumination axis is substantially parallel to the respective optical imaging axes of the imaging elements.

2. A single-axis trans-illumination system in a multi-axis imaging system, comprising:
   a multi-axis imaging system having an object plane and a plurality of laterally-distributed imaging elements for producing respective images of respective areas of an object located at the object plane, the imaging elements having respective lenses, optical imaging axes, and fields of view, said optical axes being spaced apart from one another;
   a light source; and
   an illumination subsystem disposed between the light source and the object plane of the imaging system for directing light from said light source toward the imaging elements, the illumination subsystem having a single optical illumination axis, wherein said light source is placed at the illumination subsystem front focal plane so as to provide Kohler illumination.

3. A single-axis trans-illumination system in a multi-axis imaging system, comprising:
   a multi-axis imaging system having an object plane and a plurality of laterally-distributed imaging elements for producing respective images of respective areas of an object located at the object plane, the imaging elements having respective lenses, optical imaging axes, and fields of view, said optical axes being spaced apart from one another;
   a light source; and
   an illumination subsystem disposed between the light source and the object plane of the imaging system for directing light from said light source toward the imaging elements, the illumination subsystem having a single optical illumination axis, wherein said illumination subsystem has an object plane and a conjugate image plane, said light source is placed at said object plane of said illumination subsystem, and said image plane of said illumination subsystem is placed at said object plane of said multi-axis imaging system so as to provide critical illumination.

4. A single-axis trans-illumination system in a multi-axis imaging system, comprising:
   a multi-axis imaging system having an object plane and a plurality of laterally-distributed imaging elements for producing respective images of respective areas of an object located at the object plane, the imaging elements having respective lenses, optical imaging axes, and fields of view, said optical axes being spaced apart from one another;
   a light source; and
   an illumination subsystem disposed between the light source and the object plane of the imaging system for directing light from said light source toward the imaging elements, the illumination subsystem having a single optical illumination axis, wherein said illumination subsystem includes an amplitude mask placed between said light source and said object plane of said multi-axis imaging system for controlling the image field of said illumination subsystem at said object plane of said multi-axis imaging system.

5. The single-axis trans-illumination system of claim 4, wherein said amplitude mask is placed at the object plane of said illumination subsystem or a plane conjugate thereto.

6. A single-axis trans-illumination system in a multi-axis imaging system, comprising:
   a multi-axis imaging system having an object plane and a plurality of laterally-distributed imaging elements for producing respective images of respective areas of an object located at the object plane, the imaging elements having respective lenses, optical imaging axes, and fields of view, said optical axes being spaced apart from one another;
   a light source; and
   an illumination subsystem disposed between the light source and the object plane of the imaging system for directing light from said light source toward the imaging elements, the illumination subsystem having a single optical illumination axis, wherein said light source is placed at the front focal plane of said illumination subsystem, and said illumination subsystem comprises an amplitude mask placed between said light source and said object plane of said multi-axis imaging system substantially at said front focal plane of said illumination subsystem or a plane conjugate thereto, said amplitude mask having an opaque portion to block light rays otherwise incident on said object plane of said multi-axis imaging system at or less than a first angle with respect to said illumination axis, and to pass light rays incident on said object plane of said multi-axis imaging system at an angle greater than said first angle, to provide dark field illumination.

7. A single-axis trans-illumination system in a multi-axis imaging system, comprising:
a multi-axis imaging system having an object plane and a plurality of laterally-distributed imaging elements for producing respective images of respective areas of an object located at the object plane, the imaging elements having respective lenses, optical imaging axes, and fields of view, said optical axes being spaced apart from one another;
a light source; and
an illumination subsystem disposed between the light source and the object plane of the imaging system for directing light from said light source toward the imaging elements, the illumination subsystem having a single optical illumination axis, wherein said light source is a ring-shaped light source placed at the front focal plane of said illumination subsystem to provide dark field illumination.

8. A single-axis trans-illumination system in a multi-axis imaging system, comprising:
a multi-axis imaging system having an object plane and a plurality of laterally-distributed imaging elements for producing respective images of respective areas of an object located at the object plane, the imaging elements having respective lenses, optical imaging axes, and fields of view, said optical axes being spaced apart from one another;
a light source; and
an illumination subsystem disposed between the light source and the object plane of the imaging system for directing light from said light source toward the imaging elements, the illumination subsystem having a single optical illumination axis, further comprising a plurality of phase masks placed at the respective back focal planes of said plurality of imaging elements, said phase masks having a central portion and an outer portion, the phase of light passing though the central portion being delayed a predetermined amount with respect to the phase of the light passing through the outer portion so as to produce phase contrast imaging.

9. The single-axis trans-illumination system of claim 8, wherein said predetermined amount of phase delay is substantially about pi divided by two.

10. The single-axis trans-illumination system of claim 9, wherein said light source is placed at the front focal plane of said illumination subsystem, and said illumination subsystem comprises an amplitude mask placed between said light source and said imaging object plane substantially at said front focal plane of said illumination subsystem or a plane conjugate thereto, said amplitude mask having an opaque central portion conjugate to the respective central portions of said phase masks.

11. A single-axis trans-illumination system in a multi-axis imaging system, comprising:
a multi-axis imaging system having an object plane and a plurality of laterally-distributed imaging elements for producing respective images of respective areas of an object located at the object plane, the imaging elements having respective lenses, optical imaging axes, and fields of view, said optical axes being spaced apart from one another;
a light source; and
an illumination subsystem disposed between the light source and the object plane of the imaging system for directing light from said light source toward the imaging elements, the illumination subsystem having a single optical illumination axis, further comprising a plurality of amplitude masks placed at the respective back focal planes of said plurality of imaging elements, said amplitude masks having a plurality of portions of differing transmissivity, said light source is placed at the front focal plane of said illumination subsystem, and said illumination subsystem includes a slit placed between said light source and said object plane of said multi-axis imaging system, and a polarizer between said light source and said slit, to provide Hoffman modulation contrast illumination.

12. The single-axis trans-illumination system of claim 11, wherein said polarizer is rotatable, for adjusting the effective width of said slit.

13. A single-axis trans-illumination system in a multi-axis imaging system, comprising:
a multi-axis imaging system having an object plane and a plurality of laterally-distributed imaging elements for producing respective images of respective areas of an object located at the object plane, the imaging elements having respective lenses, optical imaging axes, and fields of view, said optical axes being spaced apart from one another;
a light source; and
an illumination subsystem disposed between the light source and the object plane of the imaging system for directing light from said light source toward the imaging elements, the illumination subsystem having a single optical illumination axis, wherein said illumination subsystem includes a secondary source element placed between said light source and said object plane of said multi-axis imaging system to control the angle and position of light rays transmitted toward said object plane.

* * * * *